(12) United States Patent
Bohra et al.

(10) Patent No.: US 10,558,931 B2
(45) Date of Patent: *Feb. 11, 2020

(54) DETERMINING COMPREHENSIVENESS OF QUESTION PAPER GIVEN SYLLABUS

(71) Applicant: International Business Machines Corporation, Armonk, NY (US)

(72) Inventors: Amit P. Bohra, Pune (IN); Krishna Kummamuru, Hyderabad (IN); Swapnasarit Sahu, Bangalore (IN); Abhishek Shivkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 15/210,099

(22) Filed: Jul. 14, 2016

(65) Prior Publication Data
US 2016/0321556 A1 Nov. 3, 2016

Related U.S. Application Data

(63) Continuation of application No. 14/867,160, filed on Sep. 28, 2015, now Pat. No. 9,430,952, which is a
(Continued)

(51) Int. Cl.
*G06N 7/00* (2006.01)
*G06N 5/04* (2006.01)
(Continued)

(52) U.S. Cl.
CPC ......... *G06N 7/005* (2013.01); *G06F 16/2246* (2019.01); *G06F 16/24522* (2019.01); *G06N 5/04* (2013.01); *G09B 7/00* (2013.01)

(58) Field of Classification Search
CPC ........ G06N 5/04; G06N 99/005; G06N 7/005; G09B 7/02; G09B 7/00; G06F 16/2246;
(Continued)

(56) References Cited

U.S. PATENT DOCUMENTS

| 6,431,875 B1 | 8/2002 | Elliott et al. |
| 2006/0183099 A1* | 8/2006 | Feely ............... G09B 7/00 434/323 |

(Continued)

FOREIGN PATENT DOCUMENTS

| EP | 2575123 A1 | 3/2013 |
| JP | 2002318523 A | 10/2002 |

(Continued)

OTHER PUBLICATIONS

Narayan V. et al., "An Improved System for Coaching Assessment and Practising", WO 2010/049953 A2, May 6, 2010. (Previously supplied). (Year: 2010).*

(Continued)

*Primary Examiner* — Dave Misir
(74) *Attorney, Agent, or Firm* — Stephen R. Tkacs; Stephen J. Walder, Jr.; Reza Sarbakhsh

(57) ABSTRACT

A mechanism is provided in a data processing system for determining comprehensiveness of a question paper given a syllabus of topics. An answer and evidence generator of a question answering system executing on the data processing system finds one or more answers based on the syllabus of topics for each question in the question paper. The answer and evidence generator identifies evidence for the one or more answers in the syllabus for each question in the question paper. A concept identifier of the question answering system identifies a set of concepts in the syllabus corresponding to the evidence for each question in the question paper to form a plurality of sets of concepts. The mechanism determines a value for a comprehensiveness metric for the question paper with respect to the syllabus of topics based on the plurality of sets of concepts.

14 Claims, 4 Drawing Sheets

Related U.S. Application Data continuation of application No. 14/146,583, filed on Feb. 1, 2014, now Pat. No. 9,418,566.

(51) Int. Cl.
  *G06F 16/22* (2019.01)
  *G06F 16/2452* (2019.01)
  *G09B 7/00* (2006.01)

(58) Field of Classification Search
  CPC ........... G06F 16/24522; G06F 17/3043; G06F 17/30327; G06F 17/30443
  USPC ......................................... 706/11–12, 46, 48
  See application file for complete search history.

(56) References Cited

U.S. PATENT DOCUMENTS

| | | | |
|---|---|---|---|
| 2007/0129937 A1 | 6/2007 | Kellet et al. | |
| 2008/0026360 A1 | 1/2008 | Hull | |
| 2008/0195378 A1 | 8/2008 | Nakazawa et al. | |
| 2009/0287678 A1* | 11/2009 | Brown | G06F 17/30654 |
| 2010/0081120 A1 | 4/2010 | Nanjiani et al. | |
| 2010/0203492 A1* | 8/2010 | Nibe | G09B 7/00 434/362 |
| 2011/0066587 A1* | 3/2011 | Ferrucci | G06N 5/04 706/54 |
| 2011/0125734 A1* | 5/2011 | Duboue | G09B 7/00 707/723 |
| 2011/0257961 A1 | 10/2011 | Tinkler et al. | |
| 2012/0244510 A1 | 9/2012 | Watkins, Jr. | |
| 2013/0007055 A1 | 1/2013 | Brown et al. | |
| 2013/0017524 A1* | 1/2013 | Barborak | G09B 7/04 434/322 |
| 2013/0018652 A1 | 1/2013 | Ferrucci et al. | |
| 2013/0066886 A1 | 3/2013 | Bagchi et al. | |
| 2013/0084554 A1 | 4/2013 | Shah et al. | |
| 2014/0120513 A1 | 5/2014 | Jenkins et al. | |
| 2014/0278358 A1 | 9/2014 | Byron et al. | |
| 2015/0007010 A1 | 1/2015 | Byron et al. | |
| 2015/0039536 A1* | 2/2015 | Cook | G06N 5/02 706/11 |
| 2015/0120621 A1* | 4/2015 | Alkov | G06N 5/043 706/12 |
| 2015/0178623 A1* | 6/2015 | Balani | G06N 5/025 706/48 |
| 2015/0179082 A1* | 6/2015 | Byron | G09B 7/00 434/322 |

FOREIGN PATENT DOCUMENTS

| | | |
|---|---|---|
| WO | WO 2010/049953 A2 | 5/2010 |
| WO | WO2010/049953 A3 | 5/2010 |

OTHER PUBLICATIONS

Byron, et al., "Adapting Tabular Data for Narration", filed Mar. 15, 2013, U.S. Appl. No. 13/838,130.
Byron, et al., "Discovering Relationships in Tabular Data", filed Jul. 1, 2013, U.S. Appl. No. 13/932,435.
USPTO U.S. Appl. No. 14/139,456, 2 paces.
USPTO U.S. Appl. No. 14/146,583, 3 pages.
USPTO U.S. Appl. No. 14/867,160, 2 pages.
"Preparing Examination Papers and Preparing Students for Examinations: Guidance for Tutors", TLC: Teaching and Learning Center, Notes of Guidance Series—No. 3, May 2007, pp. 1-12 (6 total pages).
"Question Formation Enhancement", IPCOM000223766D, Nov. 28, 2012, 2 pages.
"Setting Examination Papers", Western Cape Education Department, FET NCS 2006, 18 pages.
Dimple, Paul V. et al., "Use of an Evolutionary Approach for Question Paper Template Generation", 2012 IEEE Fourth International Conference on Technology for Education, Jul. 18-20, 2012, 5 pages.
High, Rob, "The Era of Cognitive Systems: An Inside Look at IBM Watson and How it Works", IBM Corporation, Redbooks, Dec. 12, 2012, 16 pages.
Paul, Dimple V. et al., "Dynamic Examination Question Paper Generation System", 17th International Conference on Management of Data (COMAD 2011), Dec. 19-21, 2011; http://www.cse.iitb.ac.in/~comad/2011/images/presentations/dec19/wip1/comad_presentation_new_today191211.pdf, 13 pages.
Pollitt, Alastair et al., "The Demands of Examination Syllabuses and Question Papers", http://tna.europarchive.org/200906180712031/http://www.ofqual.gov.uk/files/2007-comparability-exam-standards-g-chapter5.pdf; Book: "Techniques for Monitoring the Comparability of Examination Standards", Chapter 5, published 2007, 46 pages.
Rekha, R et al., "Ontology Driven Framework for Assessing the Syllabus Fairness of a Question Paper", 2012 IEEE International Conference on Technology Enhanced Education (ICTEE), Jan. 3-5, 2012, 5 pages.
Sharma, Shubham, "JEE MAIN Question Paper", http://engg.entrancecorner.com/exams/6487-jee-main-question-paper.html; Apr. 19, 2013, 3 pages.
Yuan, Michael J. , "Watson and healthcare, How natural language processing and semantic search could revolutionize clinical decision support", IBM developerWorks, IBM Corporation, Apr. 12, 2011, 14 pages.

* cited by examiner

DETERMINING COMPREHENSIVENESS OF QUESTION PAPER GIVEN SYLLABUS

BACKGROUND

The present application relates generally to an improved data processing apparatus and method and more specifically to mechanisms for automatically determining the comprehensiveness of a question paper given the syllabus of topics.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various U.S. patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for determining comprehensiveness of a question paper given a syllabus of topics. The method comprises finding, by an answer and evidence generator of a question answering system executing on the data processing system, one or more answers based on the syllabus of topics for each question in the question paper. The method further comprises identifying, by the answer and evidence generator, evidence for the one or more answers in the syllabus for each question in the question paper. The method further comprises identifying, by a concept identifier of the question answering system, a set of concepts in the syllabus corresponding to the evidence for each question in the question paper to form a plurality of sets of concepts. The method further comprises determining a value for a comprehensiveness metric for the question paper with respect to the syllabus of topics based on the plurality of sets of concepts.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for determining the comprehensiveness of a question paper given the syllabus of topics. As data processing systems become more fast and powerful and storage devices increase in capacity, the amount of data available in various forms and formats is increasing at a tremendous rate. In the education domain, individuals not only complete undergraduate or post graduate classes but also continue learning, which happens in industries or areas of work of the individual. For assessing knowledge, various forms of tests are conducted by presenting question papers to the individuals and then evaluating their performance based on answers provided.

For effective evaluation, the quality and comprehensiveness or coverage of various topics/aspects of the syllabus is an important factor. Today, there are ways to manually or automatically generate question papers. For example, automated tools may be provided to generate question papers given a syllabus of topics. However, a good question paper is one that comprehensively covers all of the topics of a given syllabus. Due to a lack of tools to evaluate the comprehensiveness of a question paper, people do not consider measuring the comprehensiveness of a test. Rather, the person who designs the test likely follows certain guidelines with the assumption the question paper will cover all the necessary topics.

The illustrative embodiments provide a tool that automatically determines the comprehensiveness of a question paper or test. The illustrative embodiments provide a mechanism to evaluate an input question paper against a given syllabus and output a set of measures indicating various aspects of the paper, such as comprehensiveness, topic coverage, and difficulty. Given the questions, the mechanism attempts to find the most accurate answer and corresponding evidences from the syllabus. Every item of evidence is analyzed to determine the concept it covers. A concept may be associated with other concepts that support the main concept of the evidence. They syllabus itself is associated with many topics. The mechanism analyzes the topics and concepts of a particular question to determine the difficulty level of the question in particular and also the complete question set in the paper.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 1:
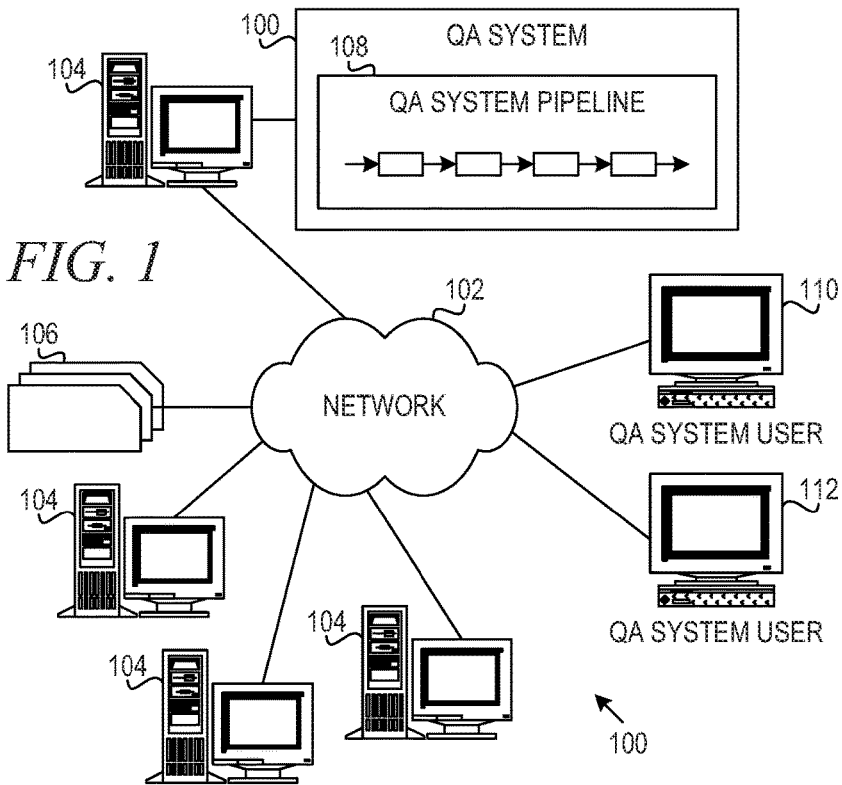
FIG. 1 depicts a schematic diagram of one illustrative embodiment of a question/answer creation (QA) system in a computer network.
Figure 2:
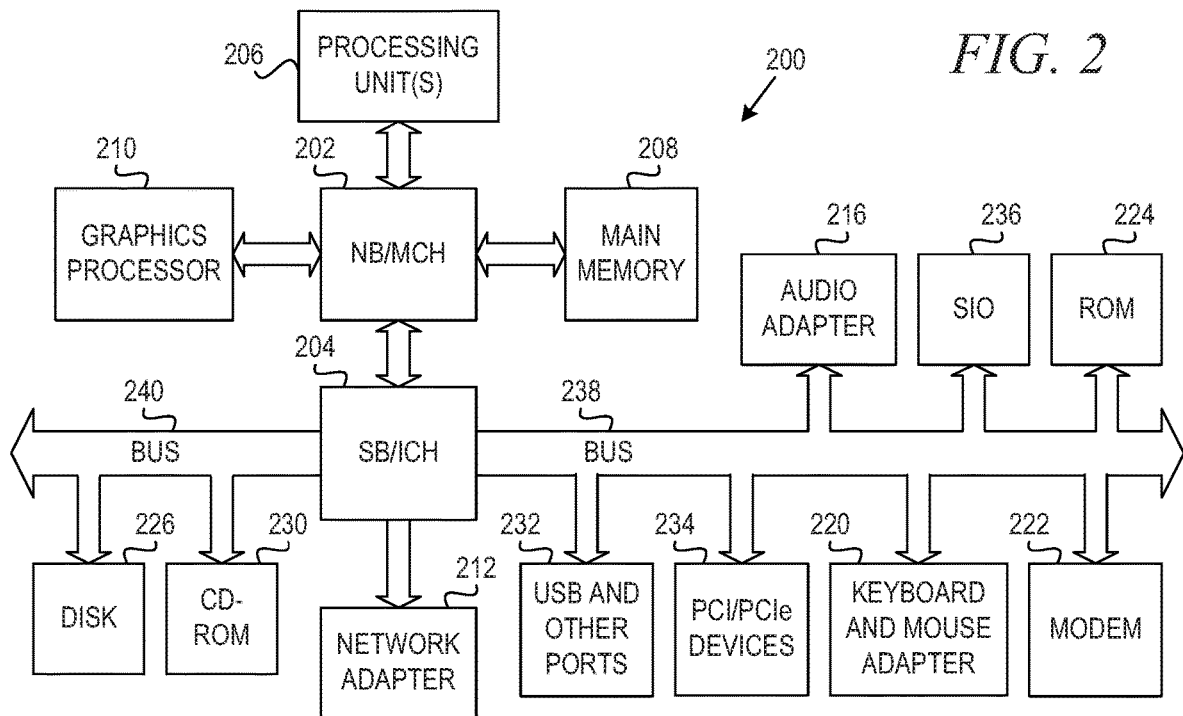
FIG. 2 is a block diagram of an example data processing system in which aspects of the illustrative embodiments may be implemented.
Figure 3:
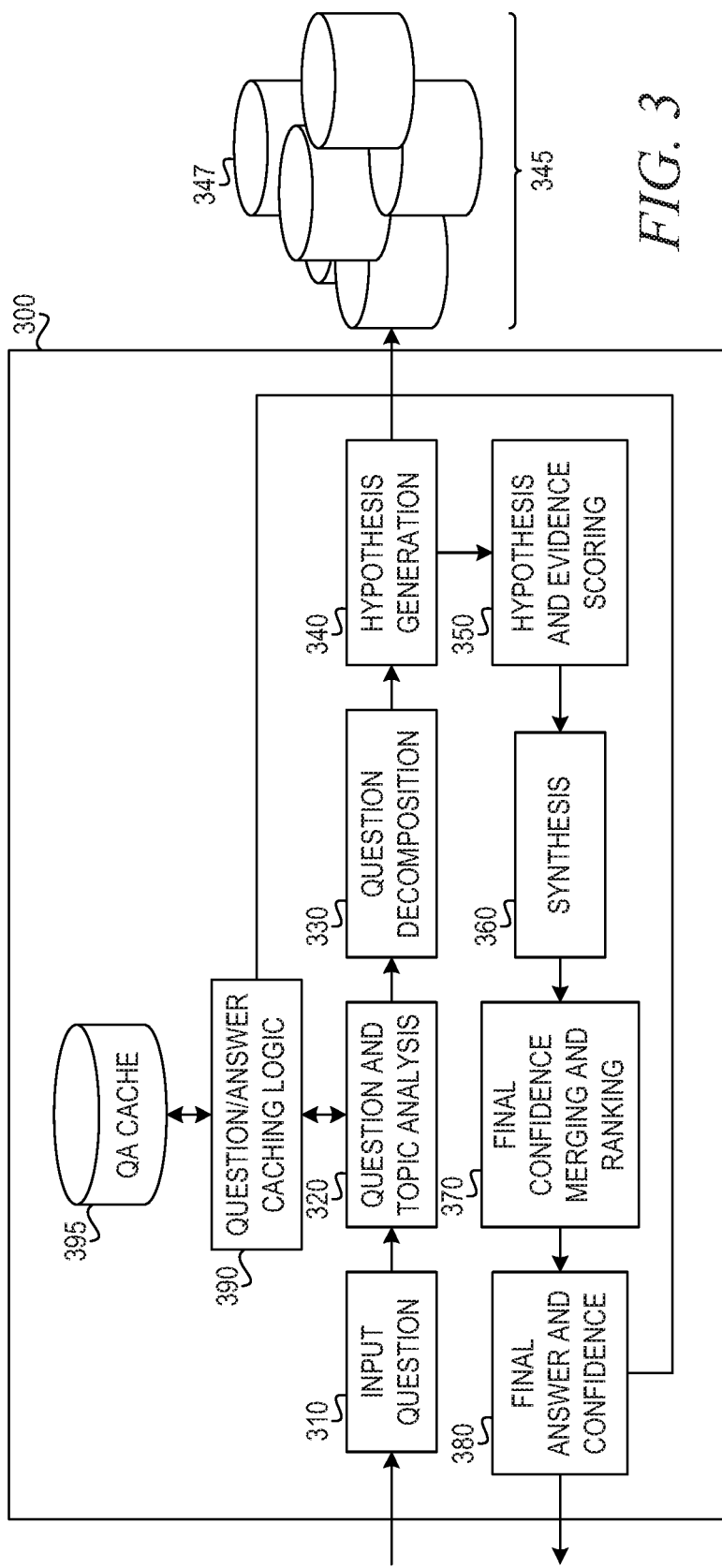
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e., candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE)

or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e., the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

Figure 4:
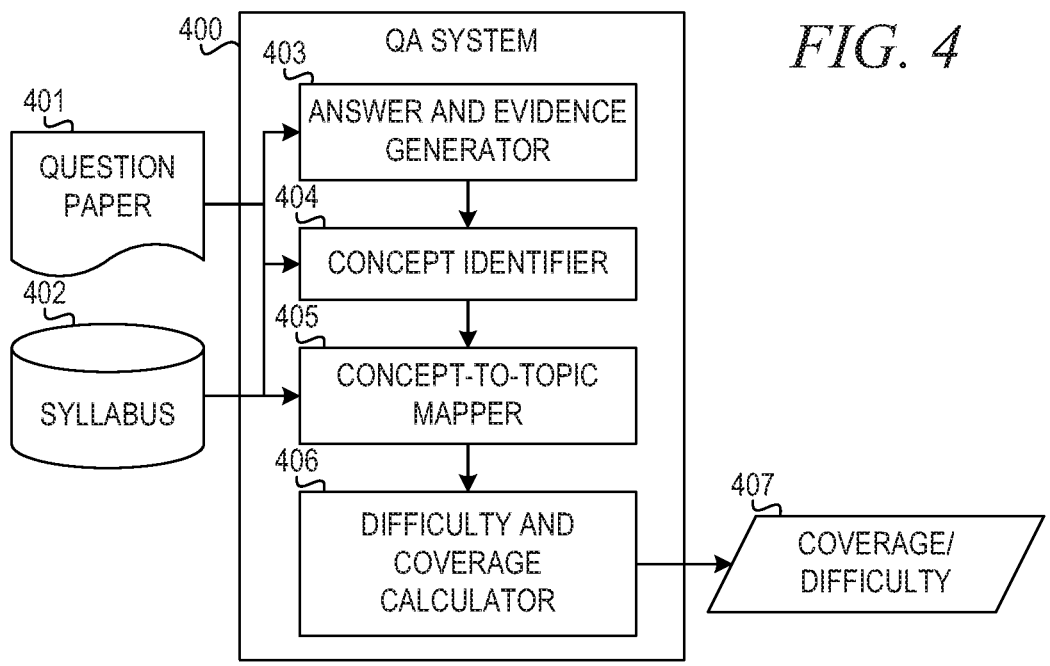
FIG. 4 is a block diagram illustrating a system for determining the comprehensiveness of a question paper given the syllabus of topics in accordance with an illustrative embodiment.

FIG. 4 is a block diagram illustrating a system for determining the comprehensiveness of a question paper given the syllabus of topics in accordance with an illustrative embodiment. Question answering (QA) system 400 receives question paper 401 and syllabus of topics 402. Question paper 401 consists of a plurality of questions $(q_1, \ldots, q_m)$ for testing an individual's understanding or comprehension of the topics of syllabus 402, which comprises all the relevant documents and topics of a domain. Syllabus 402 may also be referred to as a corpus. Syllabus 402 is in the form of text consisting of topics $(t_1, \ldots, t_n)$.

QA system 400 determines how comprehensive the question paper 401 is with respect to syllabus 402 and the difficulty level and amount of syllabus 402 covered by question paper 401. Answer and evidence (AE) generator 403 receives question paper 401 and syllabus 402 and for each question in question paper 401, attempts to find the most accurate answer and corresponding evidences from syllabus 402. Concept identifier 404 analyzes the evidence in syllabus 402 to determine the concepts covered by the answers and evidences.

Concept-to-topic mapper 405 associates each concept with other concepts that support the main concept of the evidence. For the identified concepts, concept-to-topic mapper 405 maps the concepts back to the topic to which they belong. For example, if the topic span from text location (1, 2, ..., i, i+1, ..., n) and concept spans from (i, ..., i+k), which is a subset of the previous set, then concept-to-topic mapper 405 would derive that concept belongs to that topic.

Difficulty and coverage calculator 406 determines the coverage of syllabus 402 by question paper 401 and the difficulty of the question paper 401 and outputs the coverage/difficulty 407. The coverage/difficulty output 407 may indicate, for example, how difficult the question paper is (e.g., a score between 1 and 10), how much of the syllabus is covered (e.g., a score between 1 and 10 or a percentage), whether each individual topic is covered by the question paper, etc.

More specifically, to compute the topic coverage of a question, $q_i$, the mechanism of the illustrative embodiment finds the answer, $A(q_i)$, (or set of answers) from the syllabus with the highest confidence using QA system 400. The mechanism then identifies the evidence of the answer. Then, the mechanism identifies all concepts in the evidence of answers and all concepts supporting the concepts, $C(A(q_i))$, which are considered to be covered by question $q_i$. The mechanism then determines the coverage of the syllabus, S, by a question paper, QP, as follows:

$$\mathrm{Coverage}(QP, S) = \frac{\mathrm{Length}(\mathrm{Union}_i\, C(A(q_i)))}{\mathrm{Length}(S)},$$

where Length is defined in terms of characters, words, sentences or tuples in the syllabus, S.

The mechanism determines the difficulty of the question paper by first determining that the depth of a covered topic is a function of the complexity of the concepts related to that topic. Given a question $q_i$, the mechanism first builds a tree with the central topic $t_i$ as a root node and tj as a child node if concepts of $t_j$ help in understanding the concept of $t_i$. The mechanism then builds this tree until the mechanism reaches the fundamental concepts covered by the topic $t_k$, which is a leaf node. The mechanism determines the difficulty of a question as follows:

$$\mathrm{Difficulty}(q_i, t_i) = \mathrm{Depth}(\mathrm{Tr}(t_i, t_k)),$$

where Tr is the tree as described above. The mechanism then determines the difficulty of the question paper as follows:

$$\mathrm{Difficulty}(QP, S) = \mathrm{Depth}(\mathrm{forest}\colon \mathrm{Tr}_{i, \ldots n})$$

where the forest: $\mathrm{Tr}_{i, \ldots n}$ is the combination of all trees built from the questions in the question paper, perhaps pruned, and the depth is the depth of deepest tree.

In alternative embodiments, the mechanism may determine the difficulty to be a function of the depths of the trees corresponding to the questions of the question paper. For example, the mechanism may determine the difficulty of the question paper to be an average of the tree depths, a median of the tree depths, or some other function representing an overall assessment of the depth of the concepts covered by the questions in the question paper.

Figure 5:
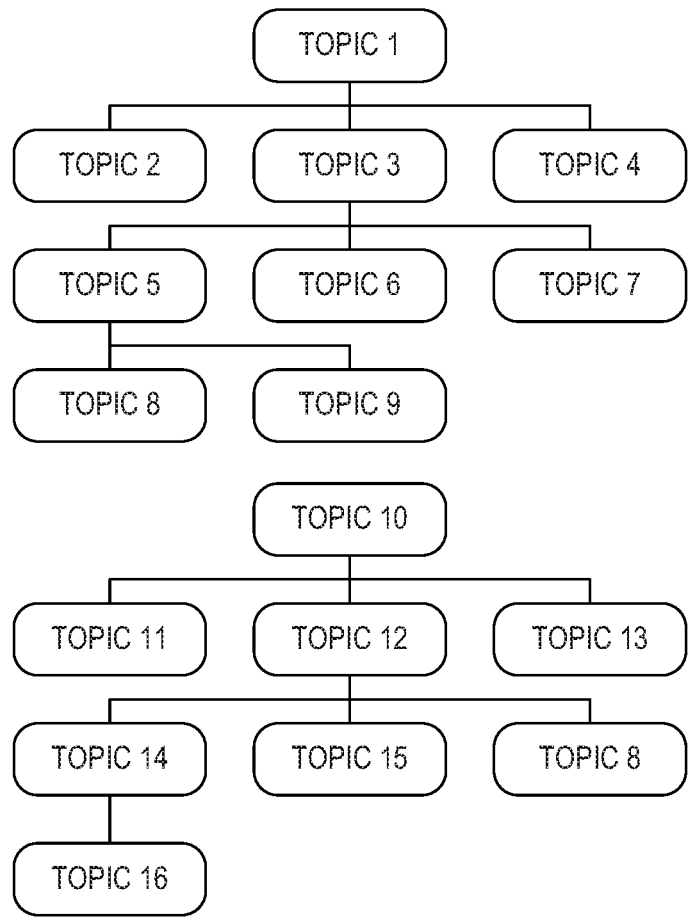
FIG. 5 illustrates a forest of trees of concepts covered by questions in a question paper in accordance with an illustrative embodiment.

FIG. 5 illustrates a forest of trees of concepts covered by questions in a question paper in accordance with an illustrative embodiment. Complexity of a concept depends on where it is first defined, how many other concepts are used to define this concept, and their complexity (depth of the topic in the scope of the text). The complexity of a question, $q_i$, depends on the complexity of the topics in $C(A(q_i))$.

Thus, in the example shown in FIG. 5, if the answer to a question is found in topic 1, and evidence and support for the answer exists in topic 3 and topic 6, then depth of this topic would be 3and the difficulty of the question would be 3. If evidence and support for the answer exists in topic 3, topic 5, and topic 9, then the depth of this topic would be 4 and the difficulty of the question would be 4.

In the depicted example, the topics 1-16 may make up a forest for the trees built based on questions of a question paper. In this example, the maximum depth is 4; therefore, the difficulty of the question paper would be 4.

As an example, consider a "Virtual Memory" topic in a syllabus entitled, "Operating System Concepts." The mechanism of the illustrative embodiments may be given this syllabus and a question paper. The topic, "Virtual Memory," may cover the following concepts: Multiprogramming, Paging, Page Replacement Algorithms (LRU, FIFO, etc.), Thrashing, Page Fault, Belady's Anomaly, Locality of Reference, Memory Mapped IO, and so on. Now, assume the question paper has many questions, one of which is related to Belady's Anomaly. For answering this question, an individual must have knowledge of concepts like Paging, Page Fault, and Belady's Anomaly. The Breadth/Coverage of the "Virtual Memory" topic covered by this question would be a function of the coverage of the concepts Paging, Page Fault, and Belady's Anomaly in the overall syllabus. The depth/complexity of the "Virtual Memory" topic covered by this question would be a function of the complexity of the concepts Paging, Page Fault, and Belady's Anomaly in the overall syllabus.

An output for this question for the "Virtual Memory" topic would be X breadth/coverage and Y depth/complexity for all the measures. As a final output, the comprehensiveness for the question paper would be a function of the output of each measure for all the questions of the question paper.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
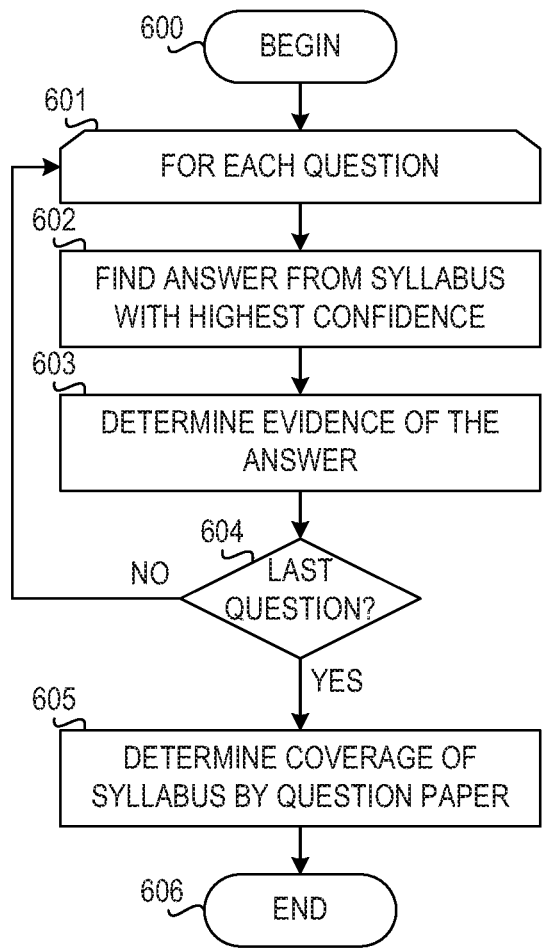
FIG. 6 is a flowchart illustrating operation of a mechanism for determining coverage of a syllabus by a question paper in accordance with an illustrative embodiment.

FIG. 6 is a flowchart illustrating operation of a mechanism for determining coverage of a syllabus by a question paper in accordance with an illustrative embodiment. Operation begins (block 600), and for each question (block 601), the mechanism finds an answer from the syllabus with a highest confidence (block 602). The mechanism determines evidence of the answer in topics and concepts of the syllabus (block 603). The mechanism then determines whether the question is the last question in the question paper (block 604). If the question is not the last question, operation returns to block 601 to consider the next question.

If the question is the last question in the question paper in block 604, the mechanism determines coverage of the syllabus by the question paper (block 605). The mechanism determines the coverage of the syllabus by determining a number of concepts providing evidence for or supporting the answers of the questions relative to a number of concepts in the syllabus. Thereafter, operation ends (block 606).

In one embodiment, the mechanism determines for each question the concepts in the evidence of the answer to the question and all the concepts that support those concepts. The mechanism sets those concepts as the concepts covered by the question. The mechanism then determines a union of all of concepts covered by the questions in the question paper. The mechanism determines a length of union of the concepts covered by the question paper and divides that by the length of the syllabus. The mechanism may determine length in terms of characters, words, sentences, or tuples.

Figure 7:
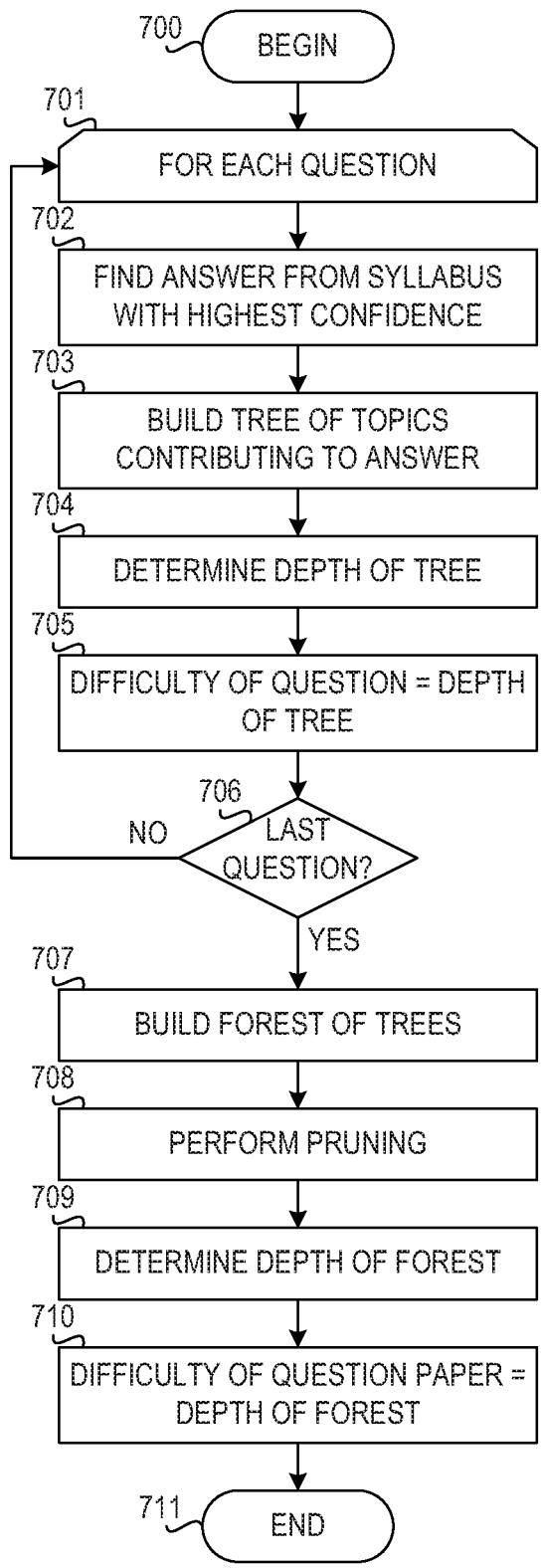
FIG. 7 is a flowchart illustrating operation of a mechanism for determining difficulty of a question paper in accordance with an illustrative embodiment.

FIG. 7 is a flowchart illustrating operation of a mechanism for determining difficulty of a question paper in accordance with an illustrative embodiment. Operation begins (block 700), and for each question (block 701), the mechanism finds an answer from the syllabus with a highest confidence (block 702). The mechanism builds a tree of topics contributing to the answer (block 703) and determines a depth of the tree (block 704). Then, the mechanism determines the difficulty of the question to be the depth of the tree (block 705). The mechanism then determines whether the question is the last question in the question paper (block 706). If the question is not the last question, operation returns to block 701 to consider the next question.

If the question is the last question in the question paper in block 706, the mechanism builds a forest of the trees (block 707). The mechanism performs tree pruning (block 708). The mechanism then determines a depth of the forest (block 709). The mechanism determines the difficulty of the question paper to be the depth of the forest (block 710). Thereafter, operation ends (block 711).

In alternative embodiments, the mechanism may determine the difficulty to be a function of the depths of the trees corresponding to the questions of the question paper. For example, the mechanism may determine the difficulty of the question paper to be an average of the tree depths, a median of the tree depths, or some other function representing an overall assessment of the depth of the concepts covered by the questions in the question paper.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining comprehensiveness of a question paper given a syllabus of topics, the method comprising:
    finding, by an answer and evidence generator of a question answering system executing on the data processing system, one or more answers based on the syllabus of topics for each question in the question paper;
    identifying, by the answer and evidence generator, evidence for the one or more answers in the syllabus for each question in the question paper;
    identifying, by a concept identifier of the question answering system, a set of concepts in the syllabus corresponding to the evidence for each question in the question paper to form a plurality of sets of concepts; and
    determining a value for a comprehensiveness metric for the question paper with respect to the syllabus of topics based on the plurality of sets of concepts,
    wherein the comprehensiveness metric comprises a difficulty metric, wherein determining the value for the comprehensiveness metric comprises:
        mapping the sets of concepts to topics in the syllabus;
        for each given question in the question paper, building a tree of topics comprising a root node representing a central topic, at least one child node representing a topic having concepts that help in understanding concepts of the central topic, and at least one leaf node representing a topic having fundamental concepts; and
        determining a value of the difficulty metric for the given question to be equal to a depth of the tree.

2. The method of claim 1, wherein finding the one or more answers in the syllabus of topics for each question in the question paper comprises using the question answering system to find one or more answers having a highest confidence score for each question in the question paper.

3. The method of claim 1, wherein determining the set of concepts for a given question comprises determining all evidence concepts in the evidence of the one or more answers and all support concepts that support the evidence concepts, wherein the set of concepts comprises the evidence concepts and the support concepts.

4. The method of claim 1, wherein determining the value for the comprehensiveness metric further comprises:
    building a forest of the trees corresponding to the questions of the question paper; and
    determining a value of the difficulty metric for the question paper to be equal to a depth of the forest.

5. A computer program product comprising a non-transitory computer readable storage medium having a computer readable program stored therein, wherein the computer readable program, when executed on a data processing system, causes the data processing system to:
    find, by an answer and evidence generator of a question answering system executing on the data processing system, one or more answers based on a syllabus of topics for each question in a question paper;
    identify, by the answer and evidence generator, evidence for the one or more answers in the syllabus for each question in the question paper;
    identify, by a concept identifier of the question answering system, a set of concepts in the syllabus corresponding to the evidence for each question in the question paper to form a plurality of sets of concepts; and
    determine a value for a comprehensiveness metric for the question paper with respect to the syllabus of topics based on the plurality of sets of concepts,
    wherein the comprehensiveness metric comprises a difficulty metric, wherein determining the value for the comprehensiveness metric comprises:
        mapping the sets of concepts to topics in the syllabus;
        for each given question in the question paper, building a tree of topics comprising a root node representing a central topic, at least one child node representing a topic having concepts that help in understanding concepts of the central topic, and at least one leaf node representing a topic having fundamental concepts; and
        determining a value of the difficulty metric for the given question to be equal to a depth of the tree.

6. The computer program product of claim 5, wherein finding the one or more answers in the syllabus of topics for each question in the question paper comprises using the question answering system to find one or more answers having a highest confidence score for each question in the question paper.

7. The computer program product of claim 5, wherein determining the set of concepts for a given question comprises determining all evidence concepts in the evidence of the one or more answers and all support concepts that support the evidence concepts, wherein the set of concepts comprises the evidence concepts and the support concepts.

8. The computer program product of claim 5, wherein determining the value for the comprehensiveness metric further comprises:
    building a forest of the trees corresponding to the questions of the question paper; and
    determining a value of the difficulty metric for the question paper to be equal to a depth of the forest.

9. The computer program product of claim 5, wherein the computer readable program is stored in a computer readable storage medium in a data processing system and wherein the computer readable program was downloaded over a network from a remote data processing system.

10. The computer program product of claim 5, wherein the computer readable program is stored in a computer readable storage medium in a server data processing system and wherein the computer readable program is downloaded over a network to a remote data processing system for use in a computer readable storage medium with the remote system.

11. An apparatus in a data processing system, the apparatus comprising:
- a processor; and
- a memory coupled to the processor, wherein the memory comprises instructions which, when executed by the processor, cause the processor to:
  - find, by an answer and evidence generator of a question answering system executing on the data processing system, one or more answers based on a syllabus of topics for each question in a question paper;
  - identify, by the answer and evidence generator, evidence for the one or more answers in the syllabus for each question in the question paper;
  - identify, by a concept identifier of the question answering system, a set of concepts in the syllabus corresponding to the evidence for each question in the question paper to form a plurality of sets of concepts; and
  - determine a value for a comprehensiveness metric for the question paper with respect to the syllabus of topics based on the plurality of sets of concepts,
- wherein the comprehensiveness metric comprises a difficulty metric, wherein determining the value for the comprehensiveness metric comprises:
  - mapping the sets of concepts to topics in the syllabus;
  - for each given question in the question paper, building a tree of topics comprising a root node representing a central topic, at least one child node representing a topic having concepts that help in understanding concepts of the central topic, and at least one leaf node representing a topic having fundamental concepts; and
  - determining a value of the difficulty metric for the given question to be equal to a depth of the tree.

12. The apparatus of claim 11, wherein finding the one or more answers in the syllabus of topics for each question in the question paper comprises using the question answering system to find one or more answers having a highest confidence score for each question in the question paper.

13. The apparatus of claim 11, wherein determining the set of concepts for a given question comprises determining all evidence concepts in the evidence of the one or more answers and all support concepts that support the evidence concepts, wherein the set of concepts comprises the evidence concepts and the support concepts.

14. The apparatus of claim 11, wherein determining the value for the comprehensiveness metric further comprises:
- building a forest of the trees corresponding to the questions of the question paper; and
- determining a value of the difficulty metric for the question paper to be equal to a depth of the forest.

\* \* \* \* \*